United States Patent
Mechaley, Jr.

(10) Patent No.: US 7,769,375 B2
(45) Date of Patent: Aug. 3, 2010

(54) SYSTEM AND METHOD FOR COMMUNICATION UTILIZING TIME DIVISION DUPLEXING

(75) Inventor: Robert G. Mechaley, Jr., Kirkland, WA (US)

(73) Assignee: Eagle River Holdings LLC, Kirkland, WA (US)

( * ) Notice: Subject to any disclaimer, the term of this patent is extended or adjusted under 35 U.S.C. 154(b) by 1022 days.

(21) Appl. No.: 11/350,538

(22) Filed: Feb. 9, 2006

(65) Prior Publication Data

US 2007/0184778 A1  Aug. 9, 2007

(51) Int. Cl.
*H04W 4/00* (2009.01)

(52) U.S. Cl. ...................................... 455/427

(58) Field of Classification Search ................ 455/3.01, 455/3.02, 427, 12.1, 13.2, 502, 67.16, 10, 455/504, 506

See application file for complete search history.

(56) References Cited

U.S. PATENT DOCUMENTS

| | | | |
|---|---|---|---|
| 6,091,936 A * | 7/2000 | Chennakeshu et al. | 455/63.3 |
| 6,278,876 B1 * | 8/2001 | Joshi et al. | 455/427 |
| 6,570,858 B1 * | 5/2003 | Emmons et al. | 370/321 |
| 7,113,778 B2 * | 9/2006 | Karabinis | 455/427 |
| 2007/0010210 A1 * | 1/2007 | Singh et al. | 455/73 |

* cited by examiner

*Primary Examiner*—Tu X Nguyen
(74) *Attorney, Agent, or Firm*—Michael J. Donohue; Davis Wright Tremaine LLP (57) ABSTRACT

An integrated communication system includes a satellite portion and a terrestrial portion. A plurality of timeslots are allocated for transmission and reception of data by the various components of the satellite portion and terrestrial portion. The allocation of timeslots to the satellite portion and the terrestrial portion may be predetermined or dynamically allocated based on traffic loads, time of day, day of week, and the like. Communication may be accomplished on a single frequency with the appropriate allocation of timeslots. The system includes delay compensation to accommodate signal processing delays and signal propagation delays. For example, a satellite may be instructed to terminate transmission prior to the end of its allocated timeslot to permit the signal from the satellite to propagate to its intended destination within the allocated timeslot to thereby avoid spillover into the next timeslot. This avoids interference between various elements of the communication system.

9 Claims, 10 Drawing Sheets

SYSTEM AND METHOD FOR COMMUNICATION UTILIZING TIME DIVISION DUPLEXING

BACKGROUND OF THE INVENTION

1. Field of the Invention

The present invention is directed generally to communications and, more particularly, to a system and method for spectrum sharing in a communication system using time-division duplexing.

2. Description of the Related Art

Telecommunication systems have evolved from simple hard-wired telephones to complex wireless networks that often include satellite as well as terrestrial components. With wireless systems, allocation of the frequency spectrum and appropriate use of the allocated spectrum is critical to satisfactory operation. Complex systems of spectrum sharing and frequency reuse have been developed as one means of sharing this limited resource with more and more users.

Some communication systems utilize both satellite and terrestrial components. This combined system often refers to the terrestrial components as an ancillary terrestrial component (ATC) communication system. Some proposals have been put forth that allow spectrum sharing by both the satellite portion and the ATC portion of a telecommunication system. That is, the ATC portion of the system reuses the frequency spectrum currently assigned to satellites.

Unfortunately, these conventional approaches often lead to performance degradation because it is very difficult to create sufficient distance between the satellites and between the ground elements to permit frequency reuse and still minimize interference. Interference between the satellite portion and the ACT portion of a communication system may lead to unacceptable data error rates and decreased overall system performance.

Therefore, it can be appreciated that there is a significant need for a system and method for frequency spectrum sharing that does not result in interference and system degradation. The present disclosure describes a system and method that provides this advantage and others as will be apparent from the following detailed description and accompanying figures.

DETAILED DESCRIPTION OF THE INVENTION

Figure 1:
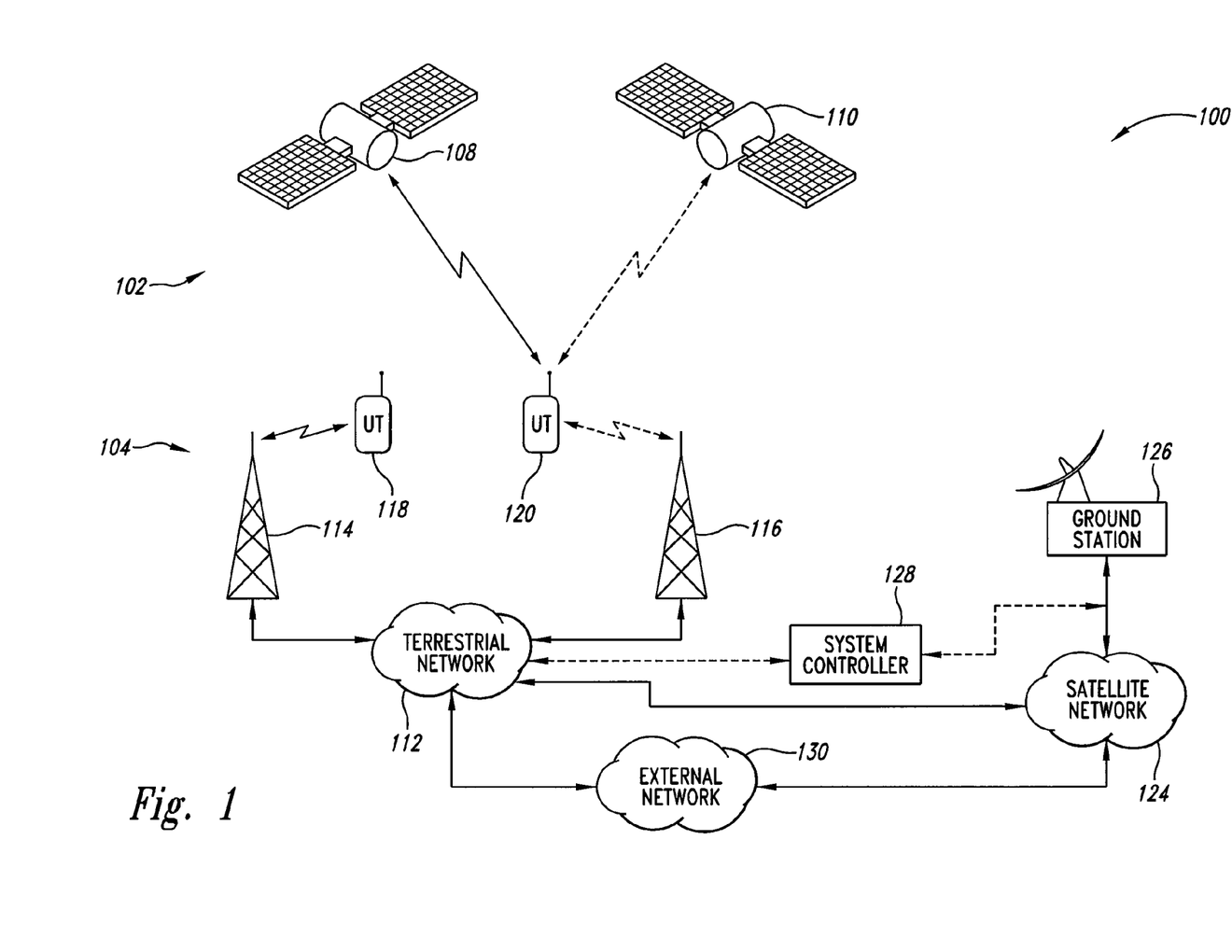
FIG. 1 is a diagram of a telecommunications system having a satellite component and a terrestrial component.

The present disclosure is directed to a telecommunication system having both satellite and terrestrial components. As will be described in greater detail below, the satellite and terrestrial components share frequencies using a time-division duplexing, which will be described in greater detail below. FIG. 1 is a diagram illustrating sample components of a system 100 constructed and operating in accordance with the teachings contained herein. The system 100 has a satellite portion 102 and a terrestrial portion 104. FIG. 1 illustrates a satellite 108 and a satellite 110 in Earth orbit. Those skilled in the art will appreciate that an actual implementation may typically include a larger number of satellites. The satellites 108-110 may be in any of known satellite configurations, such as geosynchronous or geo-stationary orbits, medium Earth orbit (MEO) or low Earth orbit (LEO). General operation of the satellite portion 102 is known to those skilled in the art and need not be described in greater detail herein except as to the time division duplexing, which will be discussed in greater detail.

The terrestrial portion 104 of the system 100 comprises a terrestrial network 112 and includes a transmission site with a base transceiver station (BTS) 114 and a transmission site with a BTS 116. Those skilled in the art will appreciate that an actual implementation of the system 100 typically includes a large number of transmission sites with each transmission site having a number of BTSs. The plurality of BTSs at a particular transmission site may be configured in a cellular arrangement with each BTS having multiple antennas (not shown) to provide coverage for multiple sectors. For the sake of simplicity, the following description will focus on the BTS 114 and the BTS 116 located at their respective transmission sites. General operational details of the BTSs 114-116 are known to those skilled in the art and need not be described in greater detail herein except as to the time division duplexing aspect, which will be described in greater detail below.

The BTS 114 and BTS 116 are coupled to the terrestrial network 112 and controlled thereby. Most control functions of the terrestrial network are well known in the art and need not be described in greater detail herein. In one aspect of the system 100, the terrestrial network 112 provides timing information to permit the BTS 114 and BTS 116 to transmit data and receive data at predetermined times.

FIG. 1 also illustrates a satellite network 124 comprising a ground station 126. Those skilled in the art will appreciate that a typical implementation of the system 100 may include a plurality of ground stations. The ground station 126 communicates with the satellites 108-110 and provides control information thereto. Most of the satellite control functions are well known to those skilled in the art and need not be described herein, except for the time division duplexing, which will be described in greater detail herein.

The system 100 includes a plurality of user terminals. A user terminal (UT) 118 is configured for terrestrial use only. That is, the UT 118 may communicate only with the BTSs 114-116. In contrast, the UT 120 is a dual-mode terminal and may communicate with either the satellite portion 102 or the terrestrial portion 104 of the system 100.

FIG. 1 also illustrates a system controller 128 coupled to the terrestrial network 112 and the satellite network 124. As will be discussed in greater detail below, the system controller 128 allocates time between the satellite and terrestrial transmission and reception and synchronizes transmit and receive times between the various elements in the system 100.

Also illustrated in FIG. 1 is an external network 130, which is coupled to the terrestrial network 112 and the satellite network 124. The external network 130 is intended to illustrate any other network, such as a public switched telephone network (PSTN), private network, or even the Internet. As those skilled in the art will appreciate, data may be relayed between a UT (e.g., the UT 118) and some destination (e.g., a conventional telephone, internet-connected host computer, etc., not shown) via the external network 130.

Figure 2:
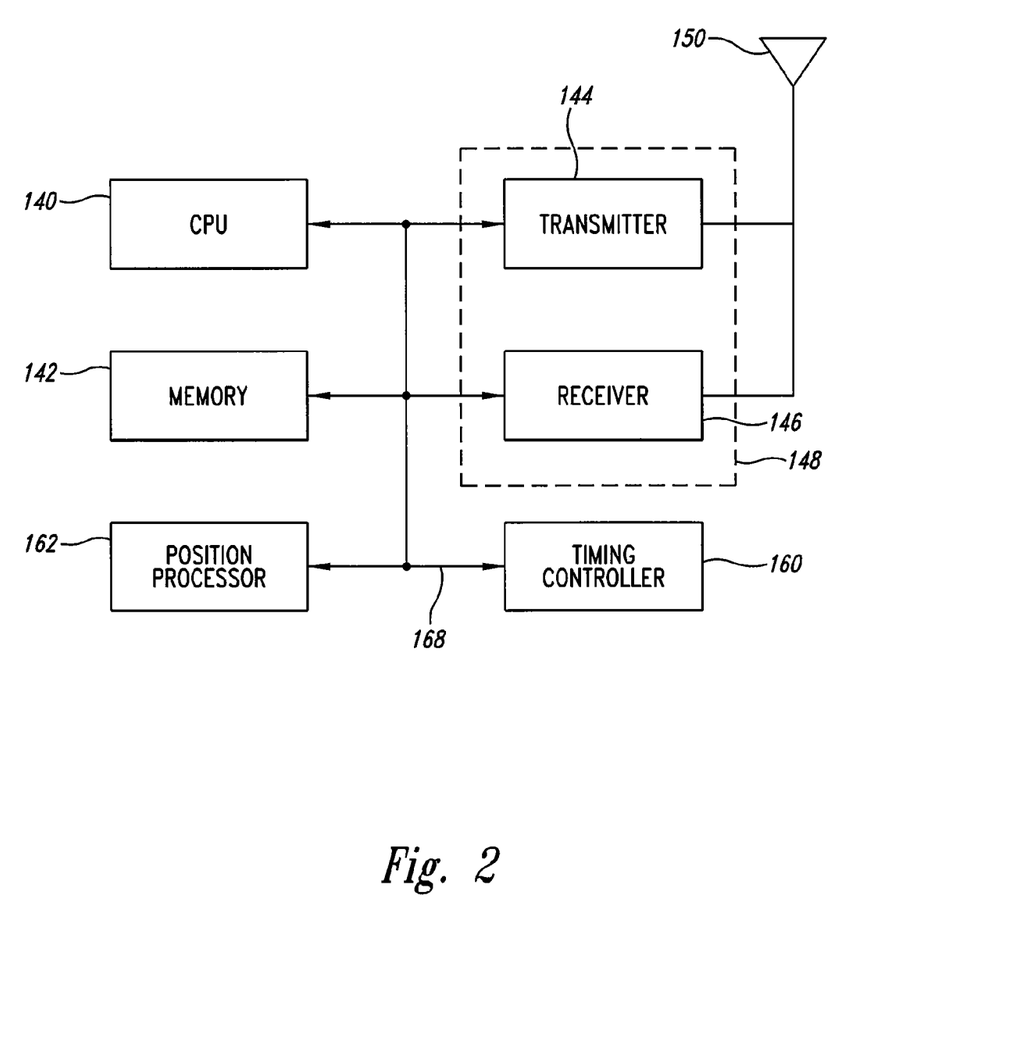
FIG. 2 is a functional block diagram of internal components of a user terminal, base station, and/or satellite component of the system of FIG. 1.

FIG. 2 is a functional block diagram illustrating internal components used by many elements of the system 100. For example, the satellites 108-110, BTSs 114-116, UTs 118-120 and the ground station 126 may all have the common components illustrated in FIG. 2. Those skilled in the art will appreciate that other common components are included in these various system elements, but need not be shown as their operation is well understood and not germane to the present discussion. In addition, those skilled in the art will appreciate that other components may be unique to different system elements but need not be shown for the same reason. For example, the satellites 108-110 typically derive power from solar panels, while the UTs 118-120 may typically rely on rechargeable batteries. The BTSs 114-116 and the ground station 126 typically are powered from external power sources (i.e., AC line-operated), but may have backup generators to provide necessary electrical power in the event of AC power loss. Thus, the different system elements may each have different power supplies that all serve the conventional function of supplying electrical power to the circuitry.

The functional block diagram of FIG. 2 includes a central processing unit (CPU) 140 and a memory 142. In general, the CPU 140 receives instructions and data from the memory 142 and executes those instructions. The CPU 140 may be implemented as a conventional microprocessor, microcontroller, programmable gate array (PGA), discrete circuit, application specific integrated circuit (ASIC), or the like. The system 100 is not limited by the specific implementation of the CPU 140. Similarly, the memory 142 may be implemented by a number of different known technologies. The memory 142 may include dynamic memory, static memory, programmable memory, or the like. The system 100 is not limited by any specific implementation of the memory 142.

FIG. 2 also illustrates a transmitter 144 and a receiver 146. The transmitter 144 and receiver 146 may be combined to form a transceiver 148. The transmitter 144 and receiver 146 are coupled to an antenna 150. As noted above, the implementation of components, such as the antenna 150, depends on the particular element of the system 100. For example, if the functional block diagram of FIG. 2 is describing a user terminal (e.g., the UT 118), the antenna 150 may be a simple omni-directional dipole antenna or other known terrestrial antenna type. In contrast, if the functional block diagram of FIG. 2 is describing a satellite (e.g., the satellite 108), the antenna 150 may comprise a highly sophisticated multi-element electronically-steerable antenna. However, the operation of elements, such as the transmitter 144, receiver 146, and antenna 150 is well understood by those skilled in the art as it pertains to each of the pieces of the communication system 100.

Those skilled in the art will also appreciate that the transmitter 144 and receiver 146 may be configured to operate in a number of different operational modes. For example, conventional multiple access techniques include time-division multiple access (TDMA), frequency-division multiple access (FDMA), code-division multiple access (CDMA), and orthogonal frequency-division multiple access (OFDMA). The system 100 is not limited by any particular form of multiple access. Similarly, the specific details of the transmitter 144 and receiver 146 are known to those skilled in the art and need not be described in greater detail herein.

FIG. 2 also illustrates a timing controller 160. As will be discussed in greater detail below, the timing controller 160 selectively enables the transmitter 144 and/or receiver 146 to transmit or receive data in respective designated timeslots. Through the appropriate control of timing, the system 100 prevents certain multiple system elements from being active at the same time, thus avoiding undesirable interference.

The block diagram of FIG. 2 also illustrates a position processor 162, which may be used to determine the present position of the particular system element. As will be discussed in greater detail below, the system 100 determines the current position of a particular system element (e.g., the UT 118 of FIG. 1) and includes these calculations in the operation of the timing controller 160. The position processor 162 may be, by way of example, a global positioning system (GPS) receiver, or the like. Those skilled in the art will also appreciate that system elements in fixed locations, such as the BTS 114, can be provided with position data during an initialization process. Because the element is fixed in position, dynamic position measurements are unnecessary.

The various components illustrated in FIG. 2 are coupled together by a bus system 168. The bus system 168 may include a power bus, address bus, data bus, and the like. For the sake of convenience, these various buses are illustrated in FIG. 2 as the bus system 168.

Figure 3:
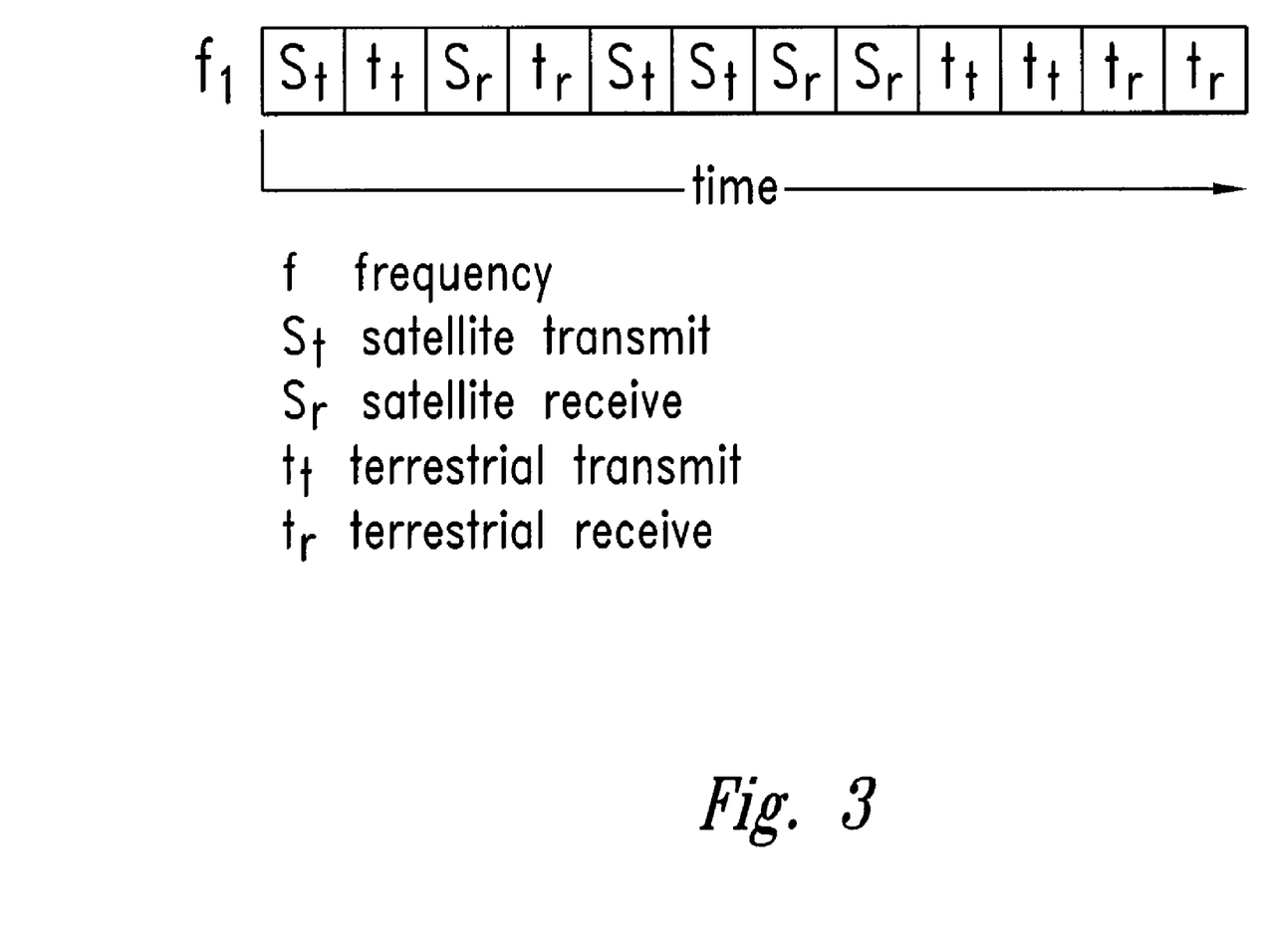
FIG. 3 is a timing diagram illustrating time division duplexing between the satellite and terrestrial portions of the system of FIG. 1.

FIG. 3 illustrates the timing operation of the system 100 in its simplest form. As illustrated in FIG. 3, the satellite and terrestrial portions of the system 100 transmit and receive data on a single frequency. This operation may be thought of as a half-duplex operation in which the same communication channel (i.e., the same frequency) is used to transmit and receive, but not at the same time. In the example illustrated in FIG. 3, a first timeslot 202 is allocated to the satellites in the system 100 (e.g., the satellites 108-110) to transmit. A second timeslot 204 is allocated to an ATC element (e.g., the BTS 114) to transmit, while a third timeslot 206 is allocated to a satellite to receive data, and a fourth timeslot 208 is allocated to a terrestrial element to receive data. Applying the example timing diagram of FIG. 3 to the system 100 illustrated in FIG. 1, the satellite 108 transmits during timeslot 202. One skilled in the art will appreciate that the UT 120 is enabled to receive data from the satellite 108 during the timeslot 202. In timeslot 204, the terrestrial system is activated to transmit. In FIG. 1, the BTS 114 and the BTS 116 are activated to transmit to the UT 118 and the UT 120, respectively. During the timeslot 206, the satellite 108 is activated to receive data. During this timeslot, the UT 120 is activated to transmit data to the satellite 108. In the timeslot 208, the terrestrial system is activated to receive data. That is, the BTS 114 and the BTS 116 receive data transmitted from the UT 118 and the UT 120, respectively. With this form of time-division duplexing, only one component of the system 100 is active at any given time, thus eliminating interference caused by the conventional satellite and ATC combination system.

The timeslots 202-208 are sequentially allocated for satellite and terrestrial transmission and reception, respectively.

However, timeslots can be allocated on a configured basis (i.e., pre-assigned) or dynamically allocated based on communications traffic load, time of day, day of week, and the like. For example, FIG. 3 also illustrates timeslots 210 and 212, which have both been allocated to a satellite element for transmission while timeslots 214 and 216 have both been allocated to a satellite element to receive data. Similarly, timeslots 218 and 220 have been allocated for a terrestrial element to transmit while timeslots 222 and 224 have been allocated for a terrestrial element to receive data. Although the example of FIG. 3 illustrates equal sharing of time slots between the satellite portion 102 and the terrestrial portion 104 of the system 100, such symmetry is not required. For example, the system 100 could allocate more time slots to ATC elements to accommodate increased communication traffic in the terrestrial portion 104. Thus, the system 100 is not limited to any specific allocation of the time slots.

Figure 4A:
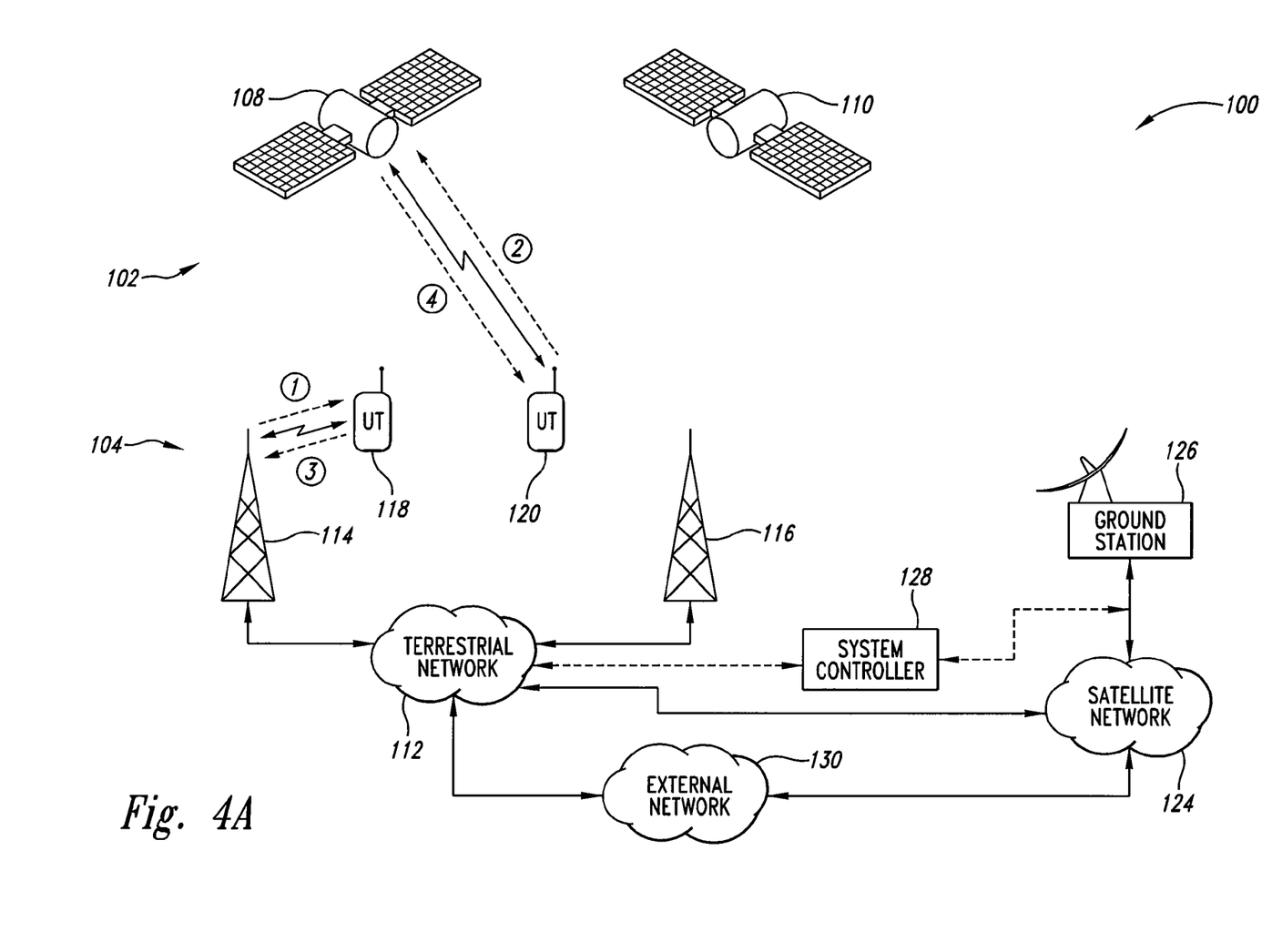
FIG. 4A is a diagram illustrating the transmission during allocated timeslots.
Figure 4B:
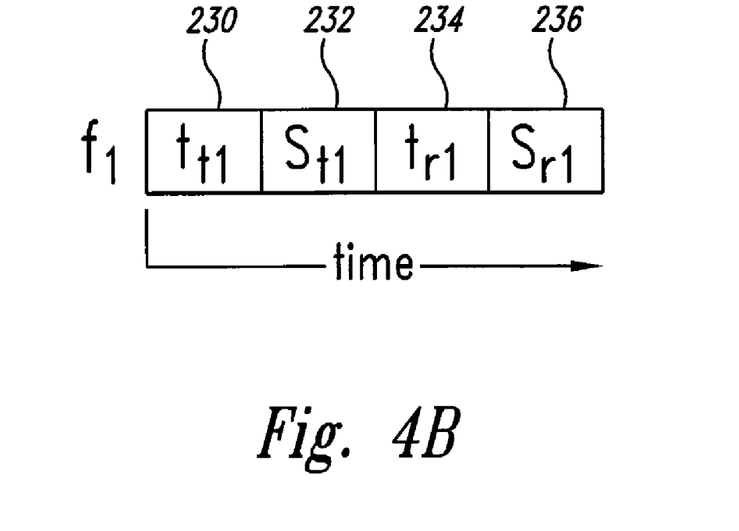
FIG. 4B is a timing diagram illustrating the allocation of timeslots in the system of FIG. 4A.

FIGS. 4A and 4B illustrate an example embodiment of the system 100. In FIG. 4A, the UT 118 is only capable of communication with one or more of the BTSs (e.g., the BTS 114) in the terrestrial portion 104 of the system 100. In this example, the UT 120 is only capable of communication with one or more of the satellites (e.g., the satellite 108) of the satellite portion 102 of the system 100. That is, the UT 120 in the example of FIGS. 4A and 4B is not a dual-mode device.

In accordance with this example, the system controller 128 assigns a first timeslot 230, shown in FIG. 4B, for transmissions by the terrestrial network and reception by the UT 118. FIG. 4A illustrates the transmission of data in timeslots 1-4 using dashed arrows to indicate the direction of data flow in the communication channels. In a second sequential timeslot 232, the satellite 108 is enabled for transmission while the UT 120 is enabled to receive data from the satellite. During a third timeslot 234, the UT 118 is enabled to transmit to the terrestrial network (e.g., the BTS 114) while in a fourth timeslot 236, the UT 120 is enabled to transmit to the satellite network (e.g., the satellite 108). Thus, each element of the system 100 is enabled at the appropriate time and cannot interfere with the operation of any other element of the system 100.

Figure 5A:
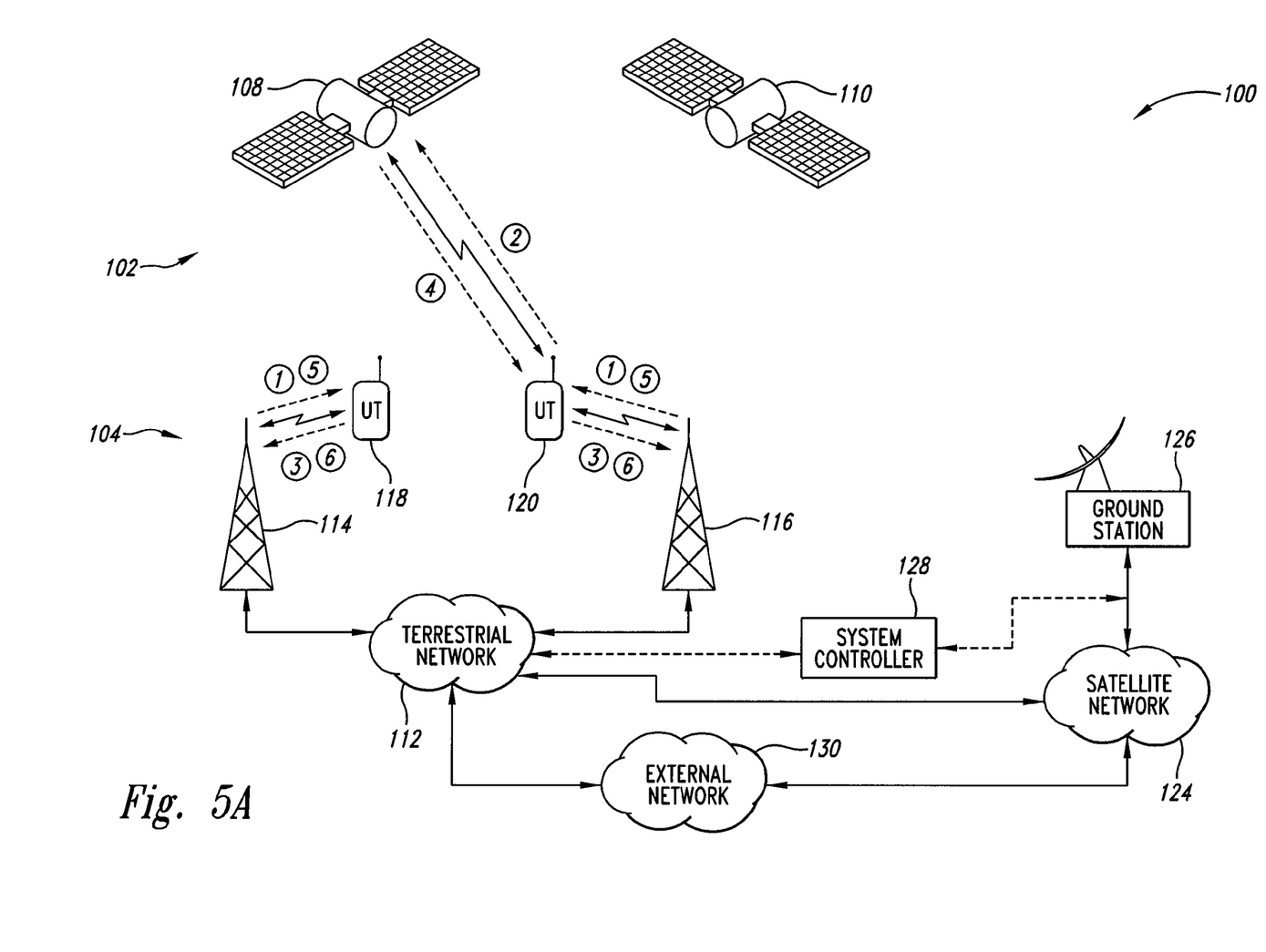
FIG. 5A is a diagram illustrating the transmission during allocated timeslots.
Figure 5B:
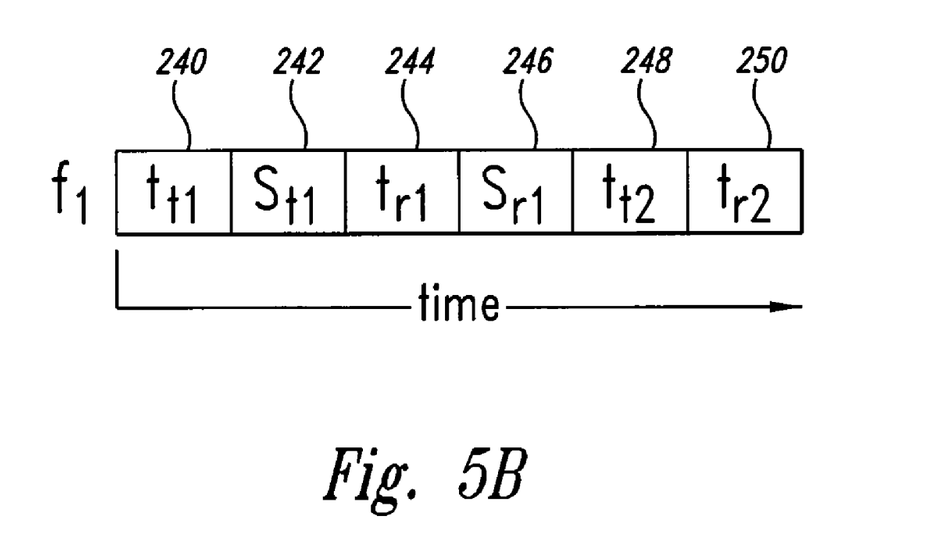
FIG. 5B is a timing diagram illustrating the allocation of timeslots in the system of FIG. 5A.

FIGS. 5A and 5B illustrate another example embodiment of the system 100. In FIG. 5A, the UT 118 is only capable of communication with one or more of the BTSs (e.g., the BTS 114) in the terrestrial portion 104 of the system 100. In this example, the UT 120 is a dual-mode device capable of communicating with one or more of the satellites (e.g., the satellite 108) in the satellite portion 102 of the system 100 and is further capable of communication with one or more of the BTSs (e.g., the BTS 116) in the terrestrial portion 104 of the system.

In accordance with this example, the system controller 128 assigns a first timeslot 240, shown in FIG. 5B, in which the BTS 114 is enabled to transmit data and the UT 118 is enabled to receive data. In one embodiment, there is sufficient physical distance between the BTS 114 and the BTS 116 to permit frequency reuse. In this example, the BTS 116 is also enabled for transmission to the UT 120 during the first timeslot. Alternatively, if the physical distance between the BTS 114 and the BTS 116 is not sufficient to permit frequency reuse, the BTS 116 can communicate with the UT 120 on a second predetermined frequency.

During a second timeslot 242, the satellite 108 is enabled to transmit data and the UT 120 is enabled to receive data. During a third timeslot 244, the BTS 114 is enabled to receive data and the UT 118 is enabled to transmit data. The UT 120 may also be enabled to transmit to the BTS 116 during the third timeslot 244. As noted above, the transmission from the UT 120 may be on the same frequency as the transmission from the UT 118 if there is sufficient separation to permit frequency reuse or on a second predetermined frequency if there is not sufficient distance to permit frequency reuse. In a fourth timeslot 246, the satellite 108 is enabled to receive data and the UT 120 is enabled to transmit data.

During a fifth timeslot 248, the BTS 114 and the BTS 116 are both enabled to transmit data and the UT 118 and the UT 120, respectively, are enabled to receive data. During a sixth timeslot 250, the UT 118 and the UT 120 are enabled to transmit data and the BTS 114 and the BTS 116 are enabled to receive data. It should be noted that the UT 118 is enabled to transmit data in two separate timeslots (i.e., the timeslots 244 and 250) and enabled to receive data in two separate timeslots (i.e., the timeslots 240 and 248). Thus, each element of the system 100 is enabled at the appropriate time and cannot interfere with the operation of any other element of the system 100.

FIG. 1 merely illustrates a communication pathway between the satellite 108 and the UT 120. However, those skilled in the art will recognize that satellites typically have a sophisticated antenna 150 that employs multiple electronically-steerable antenna elements to generate a plurality of "spot beams" that provide multiple areas of coverage on the surface of the earth. Satellites in a GEO configuration may have large spot areas that could cover, by way of example, the entire United States. In contrast, satellites in a MEO or LEO configuration may have multiple spot beams that have a much smaller area of coverage.

Figure 6:
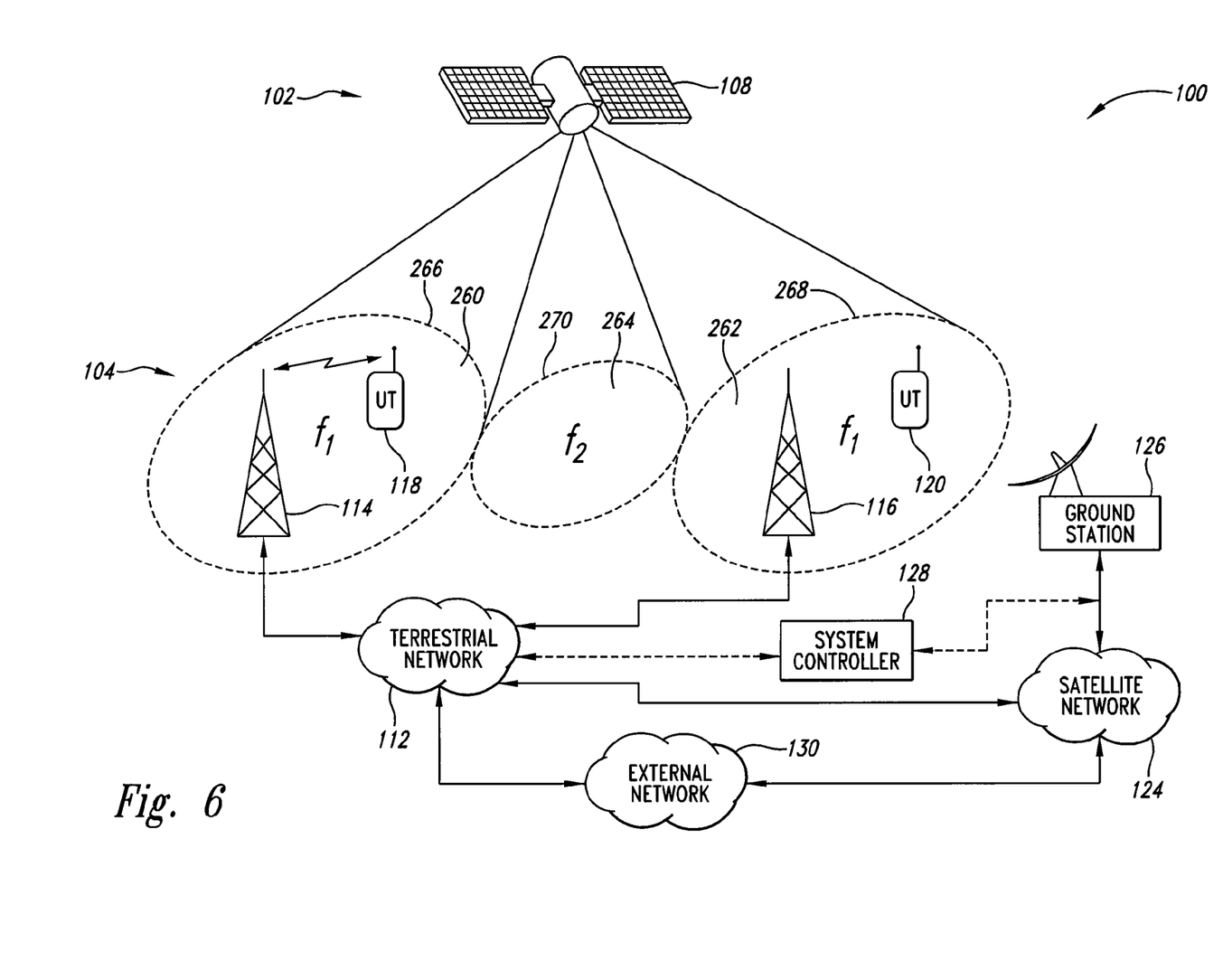
FIG. 6 is a diagram of a telecommunications system illustrating the use of multiple spot beams from a single satellite.

FIG. 6 illustrates the satellite 108 generating multiple spot beams 260-264. The spot beam 260 has an area of coverage 266 that includes the BTS 114 and the UT 118. The spot beam 262 has an area of coverage 268 that includes the BTS 116 and the UT 120. The spot beam 264 includes an area of coverage 270. In the example illustrated in FIG. 6, the area of coverage 270 does not include any BTS or UT. However, those skilled in the art will appreciate that the satellite 108 moves with respect to the surface of the earth if the satellites are in a MEO or LEO configuration. In such a configuration, the area of coverage 266-270 of the spot beams 260-264, respectively, will move across the surface of the earth as the satellite 108 progresses in its orbit.

With multiple spot beams, it is well known that frequencies can be reused so long as there is sufficient directivity in the antennas of the satellite 108 and sufficient physical separation between the areas of coverage that reuse frequencies. In FIG. 6, the satellite 108 uses a frequency, designated as $f_1$, for communication in the spot beam 260 and in the spot beam 262. The spot beam 264 intermediate the spot beams 260 and 262 may use a different frequency, designated as $f_2$, to prevent interference with the adjacent coverage areas 266 and 268. Alternatively, the spot beams 260-264 may use one or more frequencies per spot beam with the same or different allocations of time between satellite transmission and reception. In yet another alternative embodiment, the spot beams 260-264 may use the same or different frequency than adjacent spot beams with the same or different allocations of time between satellite transmission and reception. By appropriate use of time-division duplexing between the satellite portion 102 and the terrestrial portion 104, the system 100 prevents interference between the various system elements.

Those skilled in the art will also appreciate that communication systems often use a first frequency for transmitting data and a second frequency for receiving data. In some embodiments the transmit/receive frequencies are offset pairs of predetermined frequencies assigned as channels. The half duplex operation described herein is also applicable in these embodiments where timing control is still exerted over the transmitter portions of the various system elements (e.g., the transmitter in the UT 120, or the transmitter in the satellite 108) and the receiver portions of the system (e.g., the receiver portion of the UT 118 or the receiver portion of the BTS 116).

With an understanding of the timing relationship between the various elements of the system 100, the operation of the system controller 128 may now be explained in greater detail. The system controller 128 is responsible for allocation of time between satellite and terrestrial transmission and reception on the same frequency in an area covered by both the satellite portion 102 and the terrestrial portion 104 of the system 100. The area controlled by the system controller 128 could be as large as a single continent-wide beam or as small as a portion of a city or county.

The system controller 128 serves to synchronize transmit and receive times between the satellite portion 102 and the terrestrial portion 104 of the system 100. That is, the system controller 128 allocates the timeslots to the various elements in both the satellite portion 102 and the terrestrial portion 104 of the system 100 within the area of coverage controlled by the particular system controller. As previously discussed, the allocation of timeslots may be predetermined or dynamically allocated based on factors such as traffic load, time of day, time of week, geographic area, and the like.

In an exemplary embodiment, the system 100 includes compensation for delay factors, including propagation delay. Propagation delay can be significant, particularly with a GEO satellite configuration. In addition to propagation delays, signal processing delays, caused by processes such as modulation and coding, may introduce additional delays in the system 100. Those delays may be compensated either inherently in the system elements or the delay may be added to the propagation delay calculated by the system 100. The delay compensation process described below will focus on compensation for propagation delays. However, those skilled in the art will appreciate that the described techniques may also take other processing delays into account when calculating compensation times.

Figure 7A:
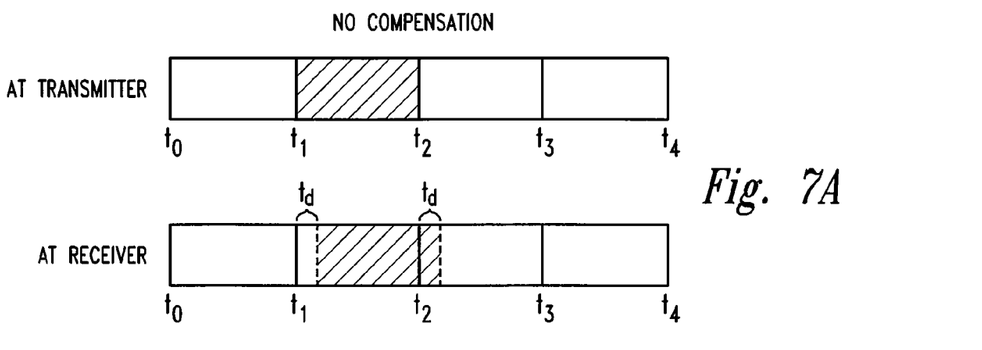
FIG. 7 is a timing diagram illustrating the timing compensation due to propagation delay used to maintain synchronization between the satellite and terrestrial portions of the telecommunications system.

FIG. 7 illustrates the operation of the system 100 to control transmissions between the satellite portion 102 and the terrestrial portion 104 of the system 100. FIG. 7 illustrates the system timing at the transmitter (e.g., the satellite 108) and at the receiver (e.g., the UT 120). For purposes of discussion of FIG. 7, the transmitter transmits data during a timeslot between time 6 and time $t_2$. In FIG. 7A, no compensation is provided. At the transmitter, transmission begins at time 6 and ends at time $t_2$, as shown in the top timing diagram of FIG. 7A. However, it takes $t_d$ seconds for the transmission to propagate from the transmitter to the receiver. Thus, data does not begin to arrive at the receiver until $t_d$ seconds after the start of the allocated timeslot (i.e., at time $t_1+t_d$), as shown in the bottom timing diagram of FIG. 7A. This decreases channel utilization, but does not cause interference. However, a similar propagation delay occurs at the end of the allocated timeslot. The transmitter terminates transmission at time $t_2$, but the signal continues to arrive at the receiver until $t_d$ seconds after the end of the allocated timeslot (i.e., at time $t_2+t_d$). Thus, the transmission from the transmitter causes interference with the system element assigned the timeslot between time $t_2$ and time $t_3$.

Figure 7B:
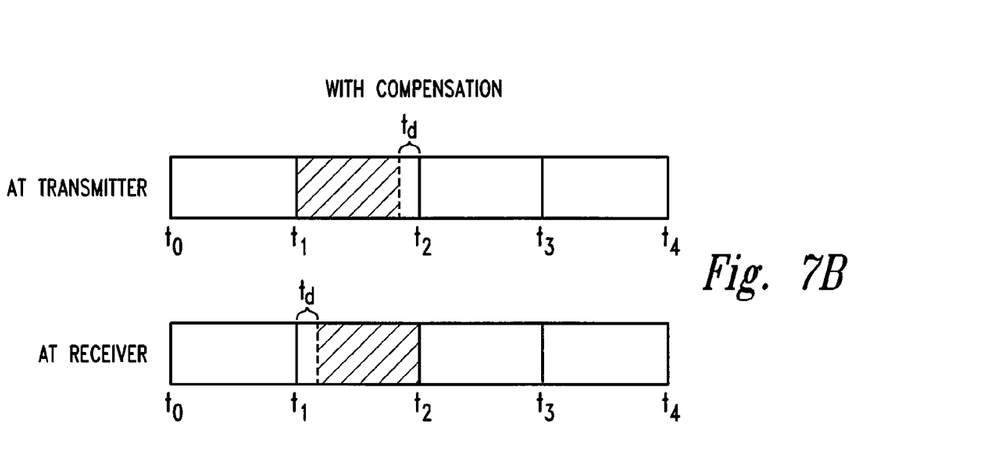

To overcome this interference source, the system 100 instructs the transmitter to terminate transmission $t_d$ seconds prior to the end of the allocated timeslot, as shown in the top timing diagram of FIG. 7B. That is, the transmitter terminates transmission $t_d$ seconds prior to time $t_2$ (i.e., at time $t_2-t_d$). The bottom timing diagram of FIG. 7B illustrates the reception of data. As noted above, with respect the FIG. 7A, data does not begin to arrive at the receiver until $t_d$ seconds after the start of the allocated timeslot (i.e., at time $t_1+t_d$). This decreases channel utilization, but does not cause interference. However, the early termination of transmission at the transmitter (i.e., at time $t_2-t_d$) permits the reception of data at the receiver to end by time $t_2$. Thus, proper synchronization is maintained between the satellite portion 102 and the terrestrial portion 104 of the system 100.

Figure 7C:
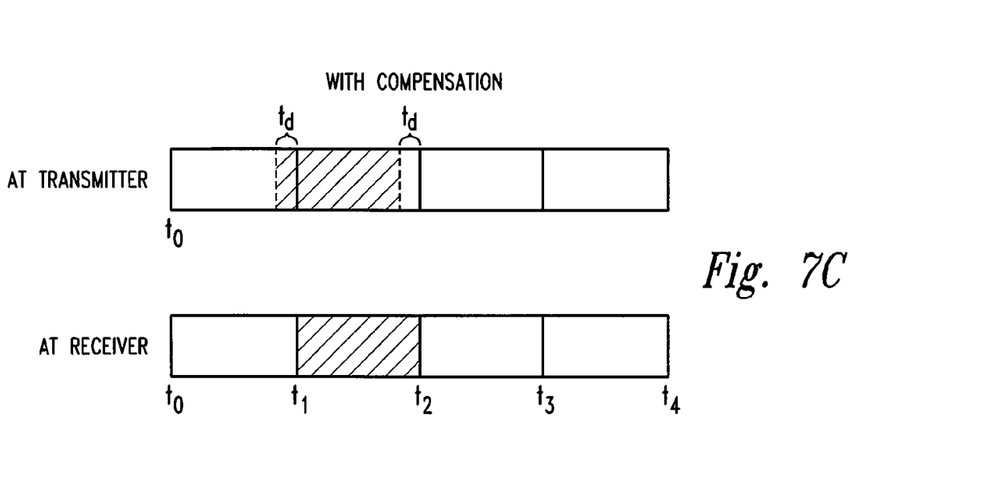

In an exemplary embodiment, channel utilization may be increased by instructing the transmitter to begin transmitting data before the start of its allocated timeslot so that data arrives at the receiver in proper synchronization. This is illustrated in FIG. 7C where the top timing diagram illustrates the transmitter timing. That is, the transmitter is instructed to begin transmission $t_d$ seconds before the start of the allocated timeslot (i.e., at time $t_1-t_d$). The data begins to arrive at the receiver $t_d$ seconds later (i.e., at time $t_1$), as illustrated in the bottom timing diagram of FIG. 7C. Furthermore, the transmitter is instructed to terminate transmission $t_d$ seconds prior to time $t_2$ (i.e., at time $t_2-t_d$). This approach provides greater channel utilization while still maintaining proper synchronization.

In an exemplary embodiment the system controller 128 performs the delay calculations and determines the appropriate compensation times. The system controller 128 provides the necessary instructions to transmitters within its control area to thereby maintain proper system synchronization. However, the delay calculation may be performed by other system elements, such as controllers in the terrestrial network 112, controllers in the satellite network 124 or the ground station 126. Further, the calculations may be performed by system elements such as a satellite (e.g., the satellite 108), a BTS (e.g., the BTS 114), or a UT (e.g., the UT 120).

Determination of propagation delay involves a knowledge of the relationship of the location of elements (e.g., the BTS 114) of the terrestrial portion 104 and the earth's surface relative to the location of the satellite (e.g., the satellite 108) in space.

The following provides a sample time delay calculation to determine range, which is the distance of the satellite from a point on earth measured in latitude and longitude. For a GEO satellite, the range is given by the following:

$$\text{Range} = \sqrt{R^2 + S^2 - 2RS \cos(\text{User } Lat.)\cos(\text{User } Long. - GEO\ Long.)}$$

Where R equals the nominal earth radius (approximately 6,378.14 kilometers), and S equals the nominal GEO satellite orbit radius (approximately 42,164.57 kilometers). Once the range has been determined, the delay can be calculated using the following:

Delay=Range/$c$

Where $c$ is the speed of light. For a GEO satellite at 115 degrees West longitude and a terrestrial system at 44 degrees North latitude, 68 degrees West longitude, the propagation delay would be 0.131430682 seconds. In this example, the system controller 128 would instruct the ground station (e.g., the BTS 114) to transmit approximately 0.131430682 seconds prior to the allocated timeslot so that the transmission arrives in synchronization with the appropriate timeslot. The system controller 128 also instructs the satellite (e.g., the satellite 108) to terminate its transmission approximately 0.131430682 seconds prior to the end of its allocated timeslot so that the transmission has propagated to the intended receiver (e.g., the UT 120 in FIG. 4A) within its allocated timeslot. In this manner, transmissions from the satellite do not spill over into the next allocated timeslot.

The system controller 128 calculates propagation delay for its control area. For example, in FIG. 9 the entire continental United States is covered by a single satellite beam and may fall under the control of a single system controller 128. The propagation delay for Key West for a particular satellite position is approximately 0.121846761 seconds while the propagation delay from the same satellite in the same position is approximately 0.129000522 seconds for a terrestrial component in Seattle.

To assure proper synchronization, the system controller 128 takes the longest propagation delay into account so that transmissions from a satellite reach the ATC element in Seattle by the end of the allocated timeslot for transmission by the satellite. If the system controller 128 used the propagation delay for Key West, the transmission would still be arriving at the Seattle ATC element in the next allocated timeslot, thus disrupting synchronization and causing possible interference. Referring to FIG. 7C, the system controller 128 would instruct the transmitter to terminate transmission $t_{dmax}$ seconds prior to time $t_2$ (i.e., at time $t_2-t_{dmax}$) where $t_{dmax}$ is the maximum propagation delay in the coverage area controlled by the system controller 128. In the example discussed above, $t_{dmax}$ is the propagation delay to Seattle.

To improve channel utilization, the system controller 128 instructs the transmitter to begin transmission prior to the start of the allocated timeslot, as discussed above with respect to FIG. 7C. Using the propagation delays for Key West and Seattle, the system controller 128 takes the shortest propagation delay into account so that transmissions from a satellite reach the ATC element in Key West at the start of the allocated timeslot for transmission by the satellite. If the system controller 128 used the propagation delay for Seattle, the transmission would arrive at the Key West ATC element prior to the start of allocated timeslot, thus disrupting synchronization and causing possible interference. Referring to FIG. 7C, the system controller 128 would instruct the transmitter to begin transmission $t_{dmin}$ seconds prior to time $t_1$ (i.e., at time $t_1-t_{dmin}$) where $t_{dmin}$ is the minimum propagation delay in the coverage area controlled by the system controller 128. In the example discussed above, $t_{dmin}$ is the propagation delay to Key West.

Figure 9:
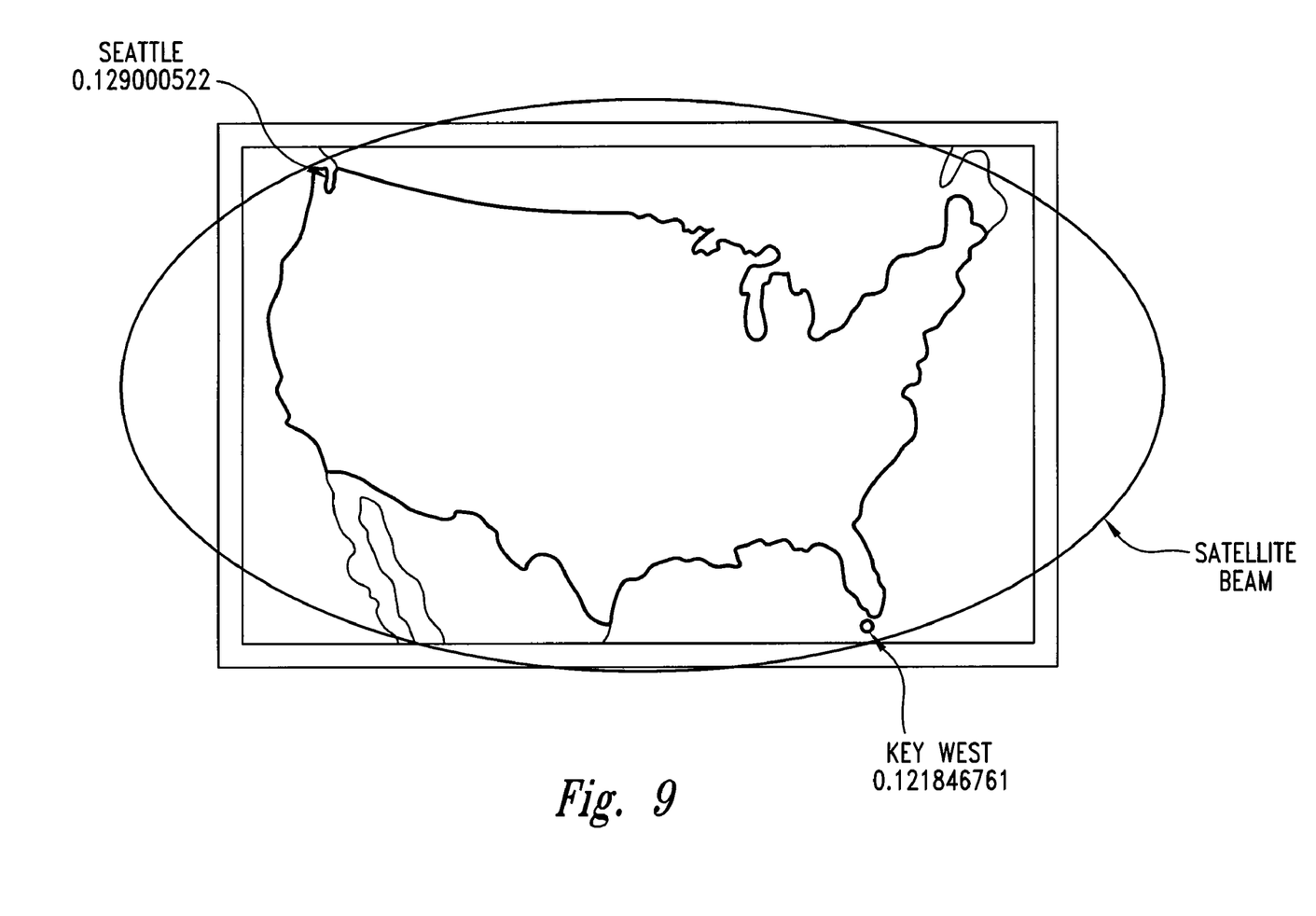
FIG. 9 is a map illustrating an example of satellite coverage in propagation delays between a sample satellite and two terrestrial locations.

If the satellite in the example of FIG. 9 includes multiple beams for multiple coverage areas (see FIG. 6), the system controller 128 may calculate the minimum and maximum propagation delays independently for each of the beam coverage areas and instruct the satellite to terminate transmission to specific coverage areas based on the maximum propagation delay for that particular coverage area.

Figure 8:
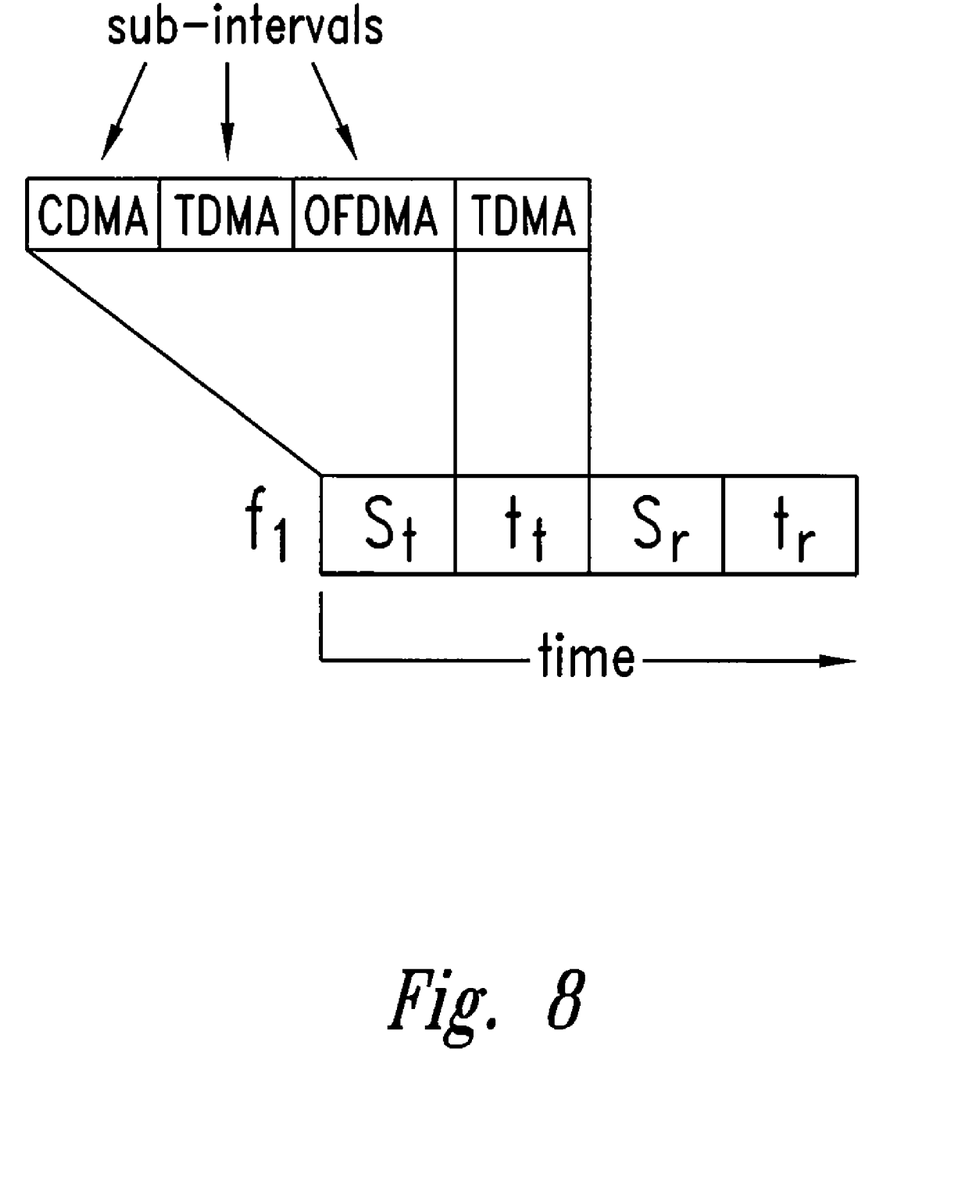
FIG. 8 illustrates the use of multiple access methods.

As previously noted, the system 100 accommodates different multiple access methods, such as TDMA, CDMA, and OFDMA. The multiple access methods can occupy a complete timeslot or a subinterval of a timeslot. FIG. 8 illustrates the allocation of timeslots to different multiple access methods. Initial access to the system 100 by a UT (e.g., the UT 118) may be accomplished by receiving a control signal in a predetermined timeslot or by receiving a control signal on a control channel. Conventional techniques, such as the Aloha reservation, reserved slot, and the like may be used for initial access to the system 100. System access operations are well known to those skilled in the art and need not be described in further detail herein.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A communication system having a satellite network portion and a terrestrial network portion, the system comprising:
   a satellite;
   a satellite transmitter configured to transmit data on a selected frequency;
   a satellite receiver configured to receive data on the selected frequency;
   a satellite timing controller to selectively control operation of the satellite transmitter and the satellite receiver;
   a first terrestrial station;
   a first terrestrial transmitter configured to transmit data on the selected frequency;

a first terrestrial receiver configured to receive data on the selected frequency; and a first terrestrial timing controller configured to selectively control operation of the first terrestrial transmitter and the first terrestrial receiver, wherein the satellite timing controller and the first terrestrial timing controller are configured to cooperatively control the respective transmitters and receivers to control transmission and reception of data in selected time intervals such that the satellite transmitter is enabled to transmit data in a first selected time interval, the satellite receiver receives data in a second selected time interval, the first terrestrial transmitter is enabled to transmit data in a third selected time interval, and the first terrestrial receiver receives data in a fourth selected time interval, wherein the satellite timing controller is configured to initiate transmission from the satellite transmitter prior to the start of the first selected time interval by an amount of time substantially equal to a propagation delay between the satellite and the first terrestrial station.

2. A communication system having a satellite network portion and a terrestrial network portion, the system comprising:

a satellite having a transmitter and receiver configured to communicate on a selected frequency;

a first terrestrial station having a transmitter and receiver configured to communicate on the selected frequency;

a satellite controller to selectively control operation of the satellite transmitter, the satellite controller enabling transmission during a first selected time interval and terminating transmission at a point in time prior to the end of the first selected time interval wherein the point in time prior to the end of the selected time interval is based on a propagation delay between the satellite and the first terrestrial station; and a first terrestrial controller to selectively control operation of the first terrestrial station transmitter, the first terrestrial controller enabling transmission during a second selected time interval contiguous with the first time interval and terminating transmission at a point in time prior to the end of the second selected time interval wherein the point in time prior to the end of the second selected time interval is based on a propagation delay between the first terrestrial station and the satellite.

3. The system of claim 2 wherein the first terrestrial station is a mobile user terminal having a transmitter and receiver configured to communicate on the selected frequency.

4. The system of claim 3 wherein the user terminal is configured for communication with the satellite only.

5. The system of claim 3 wherein the user terminal is configured for communication with the satellite or with a second terrestrial station.

6. The system of claim 3, further comprising a system controller configured to determine a propagation delay between the satellite and the first terrestrial station.

7. The system of claim 6 wherein the propagation delay between the satellite and the first terrestrial station is used by the satellite controller to terminate transmission at the point in time prior to the end of the selected time interval.

8. The communication system of claim 2 wherein the first terrestrial controller is further configured to enable transmission at a point in time prior to the second selected time interval.

9. A communication system having a satellite network portion and a terrestrial network portion, the system comprising:

a satellite having a transmitter and receiver configured to transmit and receive data on a selected frequency;

satellite control means for selectively controlling operation of the satellite transmitter and the satellite receiver;

a first terrestrial station having a transmitter and receiver configured to transmit and receive data on the selected frequency;

first terrestrial control means for selectively controlling operation of the first terrestrial transmitter and the first terrestrial receiver, wherein the satellite control means and the first terrestrial control means cooperatively control the respective transmitters and receivers to control transmission and reception of data in selected time intervals such that the satellite transmitter is enabled to transmit data in a first selected time interval, the satellite receiver receives data in a second selected time interval, the first terrestrial transmitter is enabled to transmit data in a third selected time interval, and the first terrestrial receiver receives data in a fourth selected time interval, wherein the satellite control means comprises means for initiating transmission from the satellite transmitter prior to the start of the first selected time interval by an amount of time substantially equal to a propagation delay between the satellite and the first terrestrial station.

* * * * *

UNITED STATES PATENT AND TRADEMARK OFFICE
CERTIFICATE OF CORRECTION

PATENT NO. : 7,769,375 B2  Page 1 of 1
APPLICATION NO. : 11/350538
DATED : August 3, 2010
INVENTOR(S) : Robert G. Mechaley, Jr.

It is certified that error appears in the above-identified patent and that said Letters Patent is hereby corrected as shown below:

Column 7, line 45 – "time 6" is changed to "time $t_1$"

Column 7, line 46 – "time 6" is changed to "time $t_1$"

Signed and Sealed this

Sixteenth Day of November, 2010

David J. Kappos
*Director of the United States Patent and Trademark Office*